US008308475B2

(12) United States Patent
Fairy et al.

(10) Patent No.: US 8,308,475 B2
(45) Date of Patent: *Nov. 13, 2012

(54) INJECTION MOLDING APPARATUS HAVING A VALVE PIN BUSHING

(75) Inventors: Fabrice Fairy, Barbizon (FR); Vijay Kudchadkar, Toronto (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 61 days.

This patent is subject to a terminal disclaimer.

(21) Appl. No.: 12/675,487

(22) PCT Filed: Aug. 22, 2008

(86) PCT No.: PCT/CA2008/001501
§ 371 (c)(1),
(2), (4) Date: Sep. 22, 2010

(87) PCT Pub. No.: WO2009/026689
PCT Pub. Date: Mar. 5, 2009

(65) Prior Publication Data
US 2012/0070531 A1    Mar. 22, 2012

Related U.S. Application Data

(63) Continuation of application No. 11/845,859, filed on Aug. 28, 2007, now Pat. No. 7,581,944.

(51) Int. Cl.
*B29C 45/23* (2006.01)
(52) U.S. Cl. ........................ 425/564; 425/568
(58) Field of Classification Search .................. 425/562, 425/563, 564, 565, 566, 568
See application file for complete search history.

(56) References Cited

U.S. PATENT DOCUMENTS

| 3,940,224 | A | 2/1976 | Armour |
| 3,947,175 | A | 3/1976 | Melcher |
| 4,705,473 | A | 11/1987 | Schmidt |
| 4,932,858 | A | 6/1990 | Gellert |
| 5,067,893 | A | 11/1991 | Osuna-Diaz |
| 5,192,556 | A | 3/1993 | Schmidt |
| 5,254,305 | A | 10/1993 | Fernandez et al. |
| 5,387,099 | A | 2/1995 | Gellert |
| 5,443,381 | A | 8/1995 | Gellert |
| 5,660,369 | A | 8/1997 | Gauler |

(Continued)

FOREIGN PATENT DOCUMENTS

CA    2 461 461 A1    9/2004

(Continued)

OTHER PUBLICATIONS

"Properties of Hot Sys System", http://www.hotsys.co.kr/web/text/default/text_list?menu_id=34458 May 9, 2006.

(Continued)

*Primary Examiner* — Tim Heitbrink
(74) *Attorney, Agent, or Firm* — Medler Ferro PLLC

(57) ABSTRACT

An injection molding apparatus, such as a hot runner or hot half, includes a manifold having a manifold channel and a nozzle having a nozzle channel. The nozzle is coupled to the manifold, and the manifold channel and the nozzle channel are in communication to define a flow channel. A valve pin bushing has a flow restrictor disposed in the flow channel on an upstream side of the valve pin bushing. A moveable valve pin extends through a bore of the valve pin bushing.

18 Claims, 11 Drawing Sheets

U.S. PATENT DOCUMENTS

| | | |
|---|---|---|
| 5,891,381 A | 4/1999 | Bemis et al. |
| 5,984,661 A | 11/1999 | Vorkoper |
| 6,179,604 B1 | 1/2001 | Takeda |
| 6,379,144 B1 | 4/2002 | Wright |
| 6,524,093 B2 | 2/2003 | Bouti |
| 6,679,697 B2 | 1/2004 | Bouti |
| 6,752,618 B2 | 6/2004 | Dewar et al. |
| 6,974,556 B2 | 12/2005 | Bemis et al. |
| 7,172,409 B2 | 2/2007 | Tabassi |
| 7,581,944 B2 * | 9/2009 | Fairy et al. .................... 425/564 |
| 2001/0022321 A1 | 9/2001 | Bouti |
| 2006/0024401 A1 | 2/2006 | Bazzo et al. |
| 2006/0088619 A1 | 4/2006 | Spuller |
| 2006/0097083 A1 | 5/2006 | Hofstetter et al. |
| 2006/0153945 A1 | 7/2006 | Blais et al. |
| 2007/0065538 A1 | 3/2007 | Weatherall et al. |

FOREIGN PATENT DOCUMENTS

| | | |
|---|---|---|
| CN | 2608257 Y | 3/2004 |
| DE | 23 41 589 A1 | 3/1975 |
| DE | 20 2007 005 349 U1 | 6/2007 |
| JP | 57-15941 A | 11/1982 |
| JP | 58-009728 U | 1/1983 |
| JP | 58-128827 A | 1/1983 |
| JP | 4-320820 A | 11/1992 |
| KR | 10-0296968 B1 | 5/2001 |

OTHER PUBLICATIONS

Written Opinion and Search Report in PCT/CA2008/001501, Nov. 2008.

Extended European Search Report, EP Application No. 08783410.7, mailed Jul. 25, 2012.

* cited by examiner

INJECTION MOLDING APPARATUS HAVING A VALVE PIN BUSHING

CROSS-REFERENCE TO RELATED APPLICATIONS

This application is a 35 U.S.C. §371 national stage of International Application No. PCT/CA2008/001501, filed Aug. 22, 2008, which is a continuation of U.S. application Ser. No. 11/845,859 filed Aug. 28, 2007, now U.S. Pat. No. 7,581,944 B2.

The content of the above patent application is hereby expressly incorporated by reference into the detailed description hereof.

BACKGROUND OF THE INVENTION

1. Field of the Invention

The present invention relates generally to an injection molding apparatus, and, more specifically, to an injection molding apparatus having a valve pin bushing.

2. Related Art

When molding material flowing in a channel interacts with an obstacle, such as a valve pin extending into the channel, the flow of molding material can become affected. The flow may become stagnated on a downstream side of the obstacle. In addition, the profile of the flow may become significantly uneven, an effect that can sometimes persist far downstream of the obstacle. Furthermore, if the flow upstream of the obstacle is lacking in some quality, it may be desirable to have the obstacle interact with the flow in a beneficial manner.

SUMMARY OF THE INVENTION

A valve pin bushing has a flow restrictor disposed in a flow channel.

BRIEF DESCRIPTION OF THE FIGURES

Embodiments of the present invention will now be described more fully with reference to the accompanying drawings where like reference numbers indicate similar structure.

DETAILED DESCRIPTION OF THE INVENTION

Figure 1:
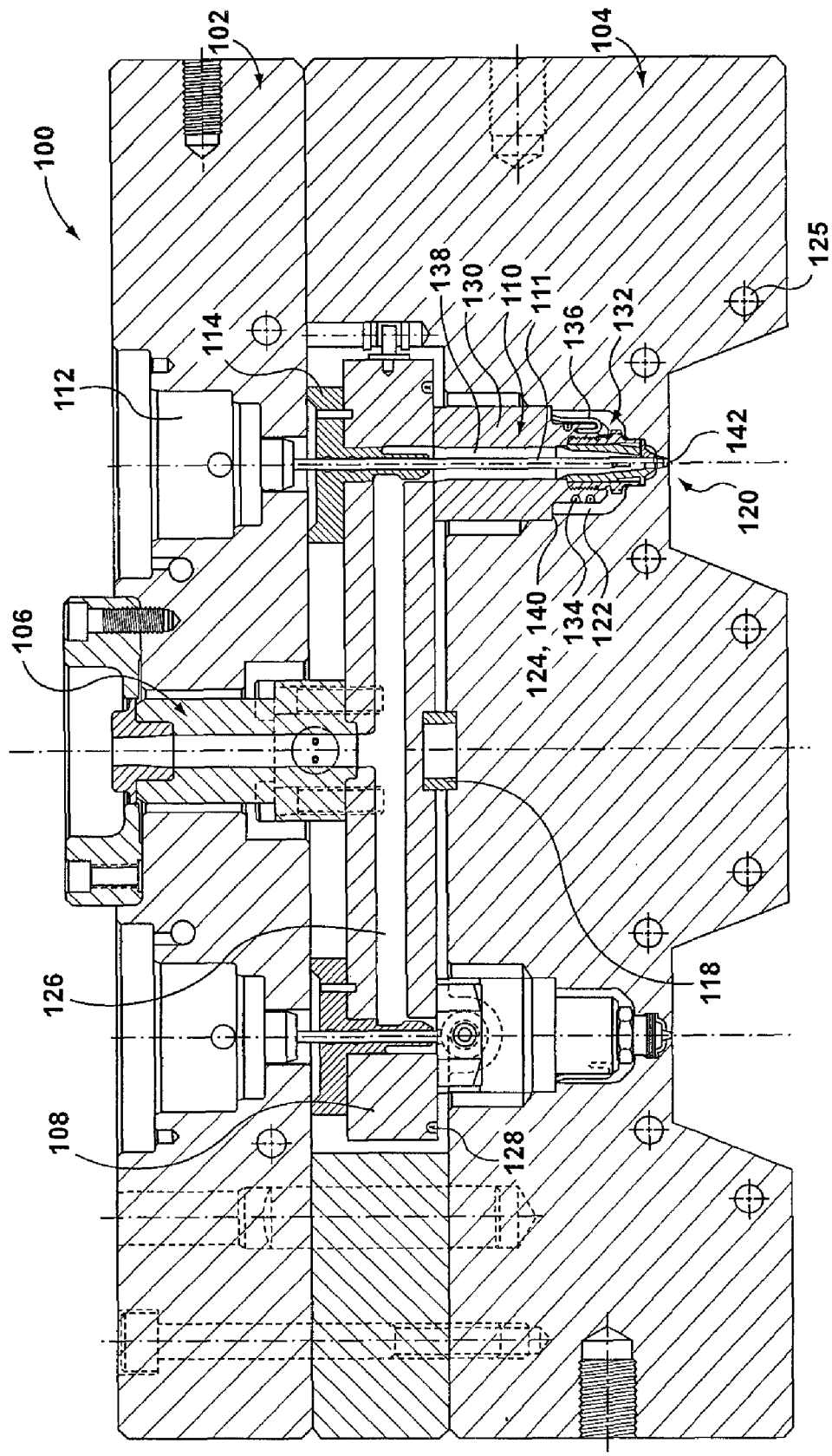
FIG. 1 is a section view of a hot half according to an embodiment of the present invention.

FIG. 1 shows a hot half 100 according to an embodiment of the present invention. The hot half 100 is one example of an injection molding apparatus. A hot runner, which mainly comprises a manifold and one or more nozzles, is another example of an injection molding apparatus. The features and aspects described for the other embodiments can be used accordingly with the present embodiment.

The hot half 100 includes a back plate 102, a mold plate 104, an inlet 106, a manifold 108, nozzles 110, valve pins 111, actuators 112, valve pin bushings 114, and a locating ring 118. The hot half 100 can be coupled to a cavity plate in which core parts are situated to define mold cavities where molded products are formed, at about 120. The hot half 100 can include additional plates and other components, such as bolts, alignment dowels, electrical connectors, mold gate inserts, and so on. The hot half 100 may also include a cavity plate, depending on the specific configuration.

The back plate 102 can have cavities, as shown, to which the actuators 112 are coupled. The back plate 102 can also have cooling channels through which cooling fluid can be circulated, which can help keep the actuators 112 and other temperature sensitive equipment at acceptable operating temperatures. The back plate 102 is but one example of common back plates that can be used in the hot half 100.

The mold plate 104 is directly or indirectly coupled to the back plate 102. The mold plate 104 can be shaped to contain the manifold 108 or can do so in conjunction with other plates. The mold plate 104 has wells 122 for containing the nozzles 110, which can include shoulders 124 for supporting the nozzles 110. The mold plate 104 can include cooling channels 125 for circulating cooling fluid. The mold plate 104 is but one example of common mold plates that can be used in the hot half 100. Additional mold plates can also be used, depending on the specific configuration.

The inlet 106 includes a sprue bushing, an inlet channel, and other components for delivering molding material (e.g., plastic melt) to the manifold 108.

The manifold 108 is disposed between the back plate 102 and the mold plate 104. The manifold 108 has a manifold channel 126 in communication with the inlet channel for delivering molding material from the inlet 106 to the nozzles 110. The manifold 108 can also have a manifold heater 128, which can be any type of heater, such as an electrical resistance heater wire.

Each nozzle 110 has a nozzle body 130 and a nozzle tip 132. A nozzle heater 134, such as an electrical resistance heater wire, and a thermocouple 136 can be installed on the nozzle body 130. The nozzle 110 has a nozzle channel 138 running therethrough. Each nozzle 110 is coupled to the manifold 108 such that the manifold channel 126 is in communication with the nozzle channel 138 to define a flow channel (ref. 202 of FIG. 2) for molding material. The nozzle body 130 can include a shoulder 140 that contacts the shoulder 124 of the mold plate 104 to support the nozzle 110. As long as one heater (i.e., heaters 128, 134) is provided, the nozzles 110 in combination with the manifold 108 can be termed a hot runner.

The valve pins 111 extend from the actuators 112 through the valve pin bushings 114, the manifold 108, and the nozzles 110. The valve pins 111 control flow of molding material through mold gates 142.

The actuators 112 are disposed in the back plate 102 and control the positions of the valve pins 111. The actuators 112 can be hydraulic, pneumatic, electrical, magnetic, or of any other design.

The valve pin bushings 114 are coupled to the manifold 108 and are held to the manifold 108 by the back plate 102. The valve pin bushings 114 serve to seal against leakage of molding material from the flow channel to the outside space between the manifold 108 and the plates 102, 104. The valve pin bushings 114 may also be designed to guide the valve pins 111 to align with the mold gates 142. The valve pin bushings 114 will be discussed in more detail later.

The locating ring 118 is situated between the manifold 108 and the mold plate 104 and serves to locate and/or support the manifold 108. The locating ring 118 is an example of a means for supporting the manifold 108 and the nozzles 110 between the back plate 102 and the mold plate 104. The above-mentioned inlet 106 and shoulders 140, 124 are another example of such means for supporting. These and other means for supporting the manifold 108 can be used alone or in combination.

Figure 2:
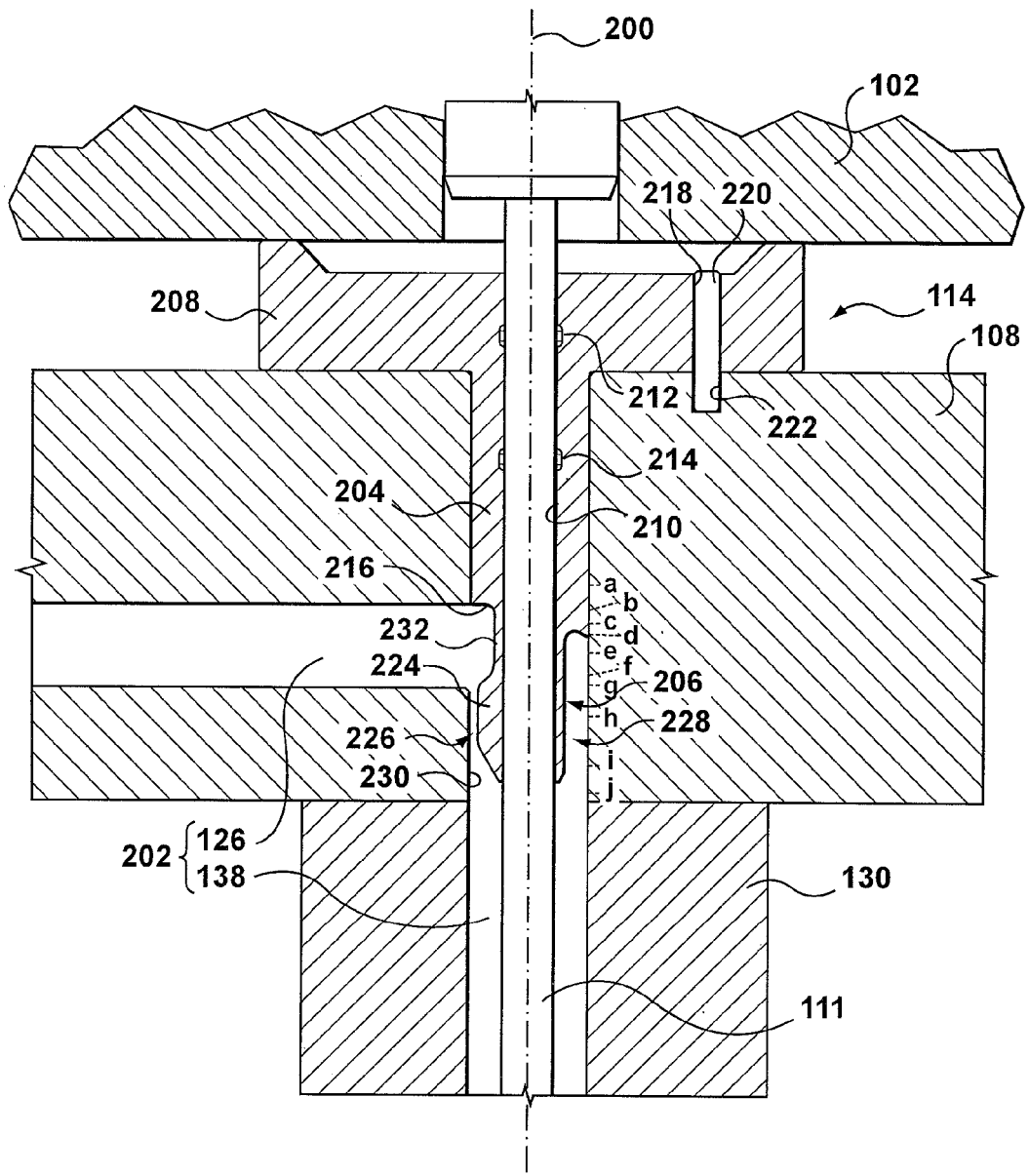
FIG. 2 is a section view of a region of the hot half of FIG. 1 in the vicinity of the valve pin bushing.

FIG. 2 illustrates a region of the hot half 100 around the valve pin bushing 114. A centerline 200 is shown aligned with the center of the valve pin 111. Because of how the molding material flows from the manifold channel 126 into the nozzle channel 138, left of the centerline 200 is referred to as the upstream side, and right of the centerline 200 is referred to as the downstream side. Thus, the upstream side is the side closer to inlet 106 and the downstream side is the side farther from inlet 106. At the same time, the upstream and downstream directions are aligned with the general direction of flow of molding material. The tip (not shown) of the valve pin 111 is in the downstream direction, and the actuator 112 is in the upstream direction. In addition, because there are numerous molding material channel configurations for hot halves and hot runners and because the embodiments disclosed herein are independent of specific channel configuration, the manifold channel 126 and the nozzle channel 138 are referred to as the flow channel 202. For example, the valve pin bushing 114 may extend into either or both of a manifold channel and a nozzle channel Likewise, the manifold and nozzle channels may be arranged at various angles, and these channels may meet inside the nozzle, inside the manifold, or inside another component. The configuration of channels presented herein is illustrative. The above considerations apply to all embodiments described herein.

The valve pin bushing 114 includes a body 204, an elongated projecting portion 206 extending from the body 204 into the flow channel 202, and an enlarged disc portion 208 extending from the body 204 at an end opposite the projecting portion 206. A bore 210 extends through the disc portion 208, the body 204, and the projecting portion 206 to accommodate the valve pin 111.

The valve pin 111 is moveable in the bore 210 and is in continual contact with the valve pin bushing 114 over its full range of movement. In this way, the valve pin bushing 114 forms a seal with the valve pin 111 and further can serve to guide the valve pin 111. To assist in sealing, the valve pin bushing 114 can also include one or more grooves 212, 214 in an inside surface of the bore 210.

The body 204 is generally cylindrical, though other cross-sectional shapes are also suitable. The body 204 is disposed in a bore of the manifold 108. In other manifold-nozzle configurations, the body 204 can be disposed in a bore of the nozzle 110. At an end nearest the projecting portion 206, the body 204 has a flow-guiding surface 216. The flow-guiding surface 216 can be a flat, beveled surface or a curved surface (as shown). One purpose of the flow-guiding surface 216 is to gradually guide the flow of molding material around the corner formed in the manifold melt channel 126.

The disc portion 208 is disposed between the back plate 102 and the manifold 108 and serves to hold the valve pin bushing 114 in place. The disc portion 208 includes a bore 218 for receiving an alignment pin 220, which is also inserted into a bore 222 of the manifold 108. The alignment pin 220 serves to properly orientate the valve pin bushing 114 with respect to the flow channel 202.

In this embodiment, the projecting portion 206 of the valve pin bushing 114 is tubular in shape. The projecting portion 206 extends into the flow channel 202 to define an annular section in the flow channel 202. The projecting portion 206 can support or shield the valve pin 111 against forces exerted by the molding material as the molding material flows in the flow channel 202.

An upstream side of the projecting portion 206 includes a flow restrictor 224 disposed in the annular section of the flow channel 202. In this embodiment, the flow restrictor 224 is a lateral protrusion. As can be seen, the flow restrictor 224 defines a restricted region 226 of the annular section and an unrestricted region 228 opposite the restricted region 226. The restricted region 226 is on the upstream side of the valve pin bushing 114, and the unrestricted region 228 is on the downstream side of the valve pin bushing 114. Molding material can flow in both the restricted and unrestricted regions 226, 228, but the restricted region 226 offers greater resistance to flow than does the unrestricted region 228. In this embodiment, the flow restrictor 224 is separated from a wall 230 of the flow channel 202 by a gap that defines the restricted region 226.

The flow restrictor 224 establishes resistance to flow of molding material on the upstream side of the projecting portion 206, thereby diverting molding material to the downstream side of the projecting portion 206 via a neck 232 of the projecting portion 206 upstream of the flow restrictor 224. The resulting increased mass and/or velocity of molding material on the downstream side of the projecting portion 206 (i.e., in the valve pin shadow region) reduces the chance that molding material will stagnate there.

In this embodiment, from the flow restrictor 224 to the downstream tip of the valve pin 111 (near mold gate 142), the flow channel 202 is a continuous annular channel. In other embodiments, other components, such as valve pin guiding fins, may exist in the flow channel 202.

In other embodiments, the flow restrictor 224 need not be entirely on the upstream side of the projecting portion 206, but can intrude to some degree on the downstream side, as long as a substantially continuous unrestricted region exists on the downstream side of the projecting portion 206. In still other embodiments, the unrestricted region 228 need not be entirely on the downstream side of the projecting portion 206, but can intrude to some degree on the upstream side, as long as the flow restrictor 224 exists on the upstream side of the projecting portion 206.

Figure 3:
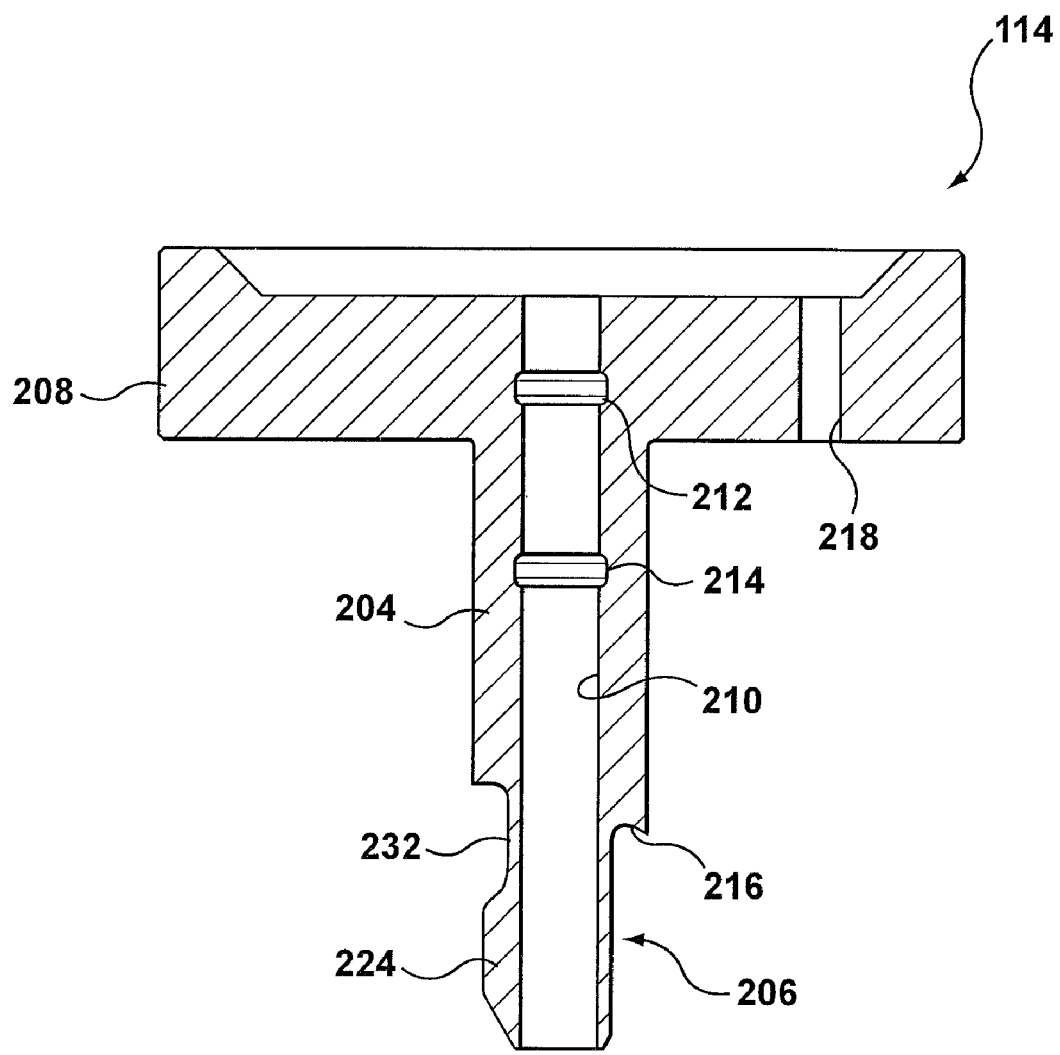
FIG. 3 is a section view of the valve pin bushing of FIG. 2.

FIG. 3 shows the valve pin bushing 114 in section and removed from the hot half 100.

Figure 4:
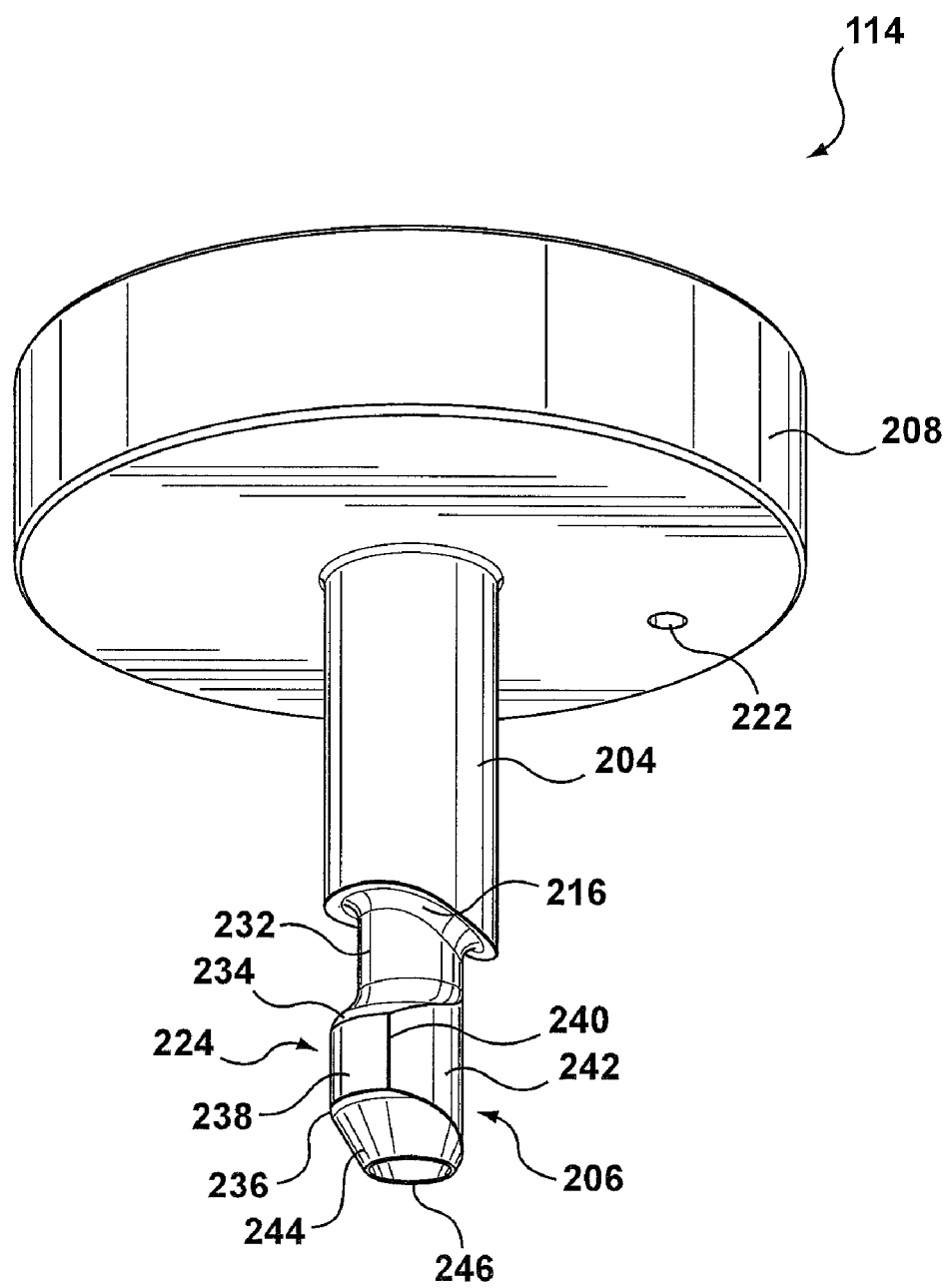
FIG. 4 is a perspective view of the valve pin bushing of FIG. 2.

FIG. 4 shows the valve pin bushing 114 in perspective. The curved shape of the flow-guiding surface 216 can be seen. The shape of the flow restrictor 224 can also be seen. In this embodiment, the flow restrictor 224 has a convex upstream surface 234, a convex downstream surface 236, and an intermediate surface 238 of constant radius (with reference to the centerline 200) therebetween that defines much of the restricted region 226. Staring at edges 240 (only one visible), the radius of the flow restrictor 224 gradually decreases along a curved transition surface 242 until it meets the radius of the tubular projecting portion 206 on the downstream side. A downstream portion of the flow restrictor 224 has a frusto-conical surface 244 that makes a transition to the tubular projecting portion 206 on the downstream side and ends at a most downstream end 246 of the valve pin bushing 114. In other embodiments, other shapes for the flow restrictor 224 can be used, resulting in other shapes for the restricted and unrestricted regions that the flow restrictor 224 defines.

FIGS. 5a-5j show modified cross-sections of the valve pin bushing 114 taken as slices perpendicular to the centerline 200 at locations indicated by the corresponding letters a-j shown in FIG. 2. The cross-sections are modified in that they show solid material as clear regions and show molding material as a cross-hatched region bounded on the outside by the wall 230 of the flow channel 202. These modifications are intended to better show the shape of the flow restrictor 224 and the annular sections of the flow channel 202 that it defines. The sections shown progress from most upstream, FIG. 5a, to most downstream, FIG. 5j.

Figure 5A:
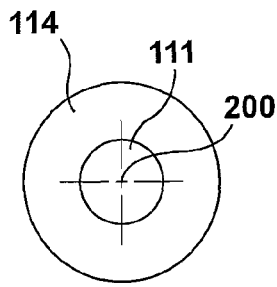
FIGS. 5a-5j are modified cross-sections of the valve pin bushing of FIG. 2 taken at points a-j shown in FIG. 2, respectively.
Figure 5F:
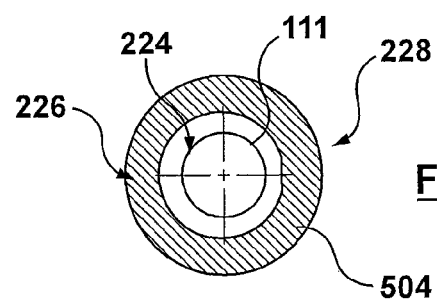
Figure 5B:
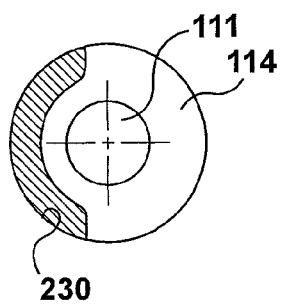
Figure 5G:
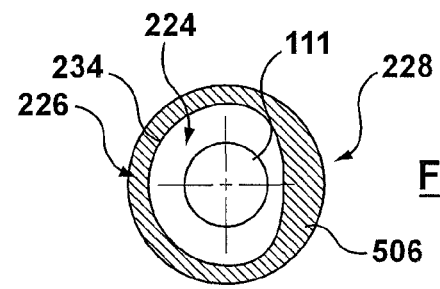
Figure 5C:
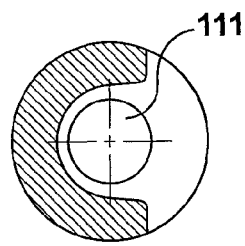
Figure 5H:
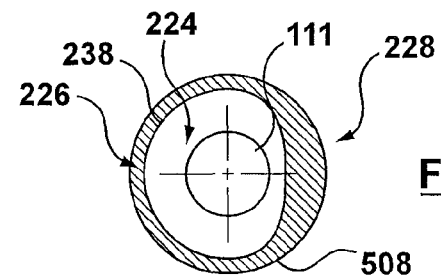
Figure 5D:
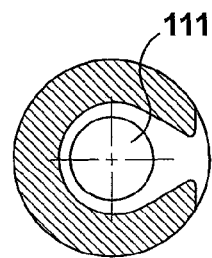
Figure 5I:
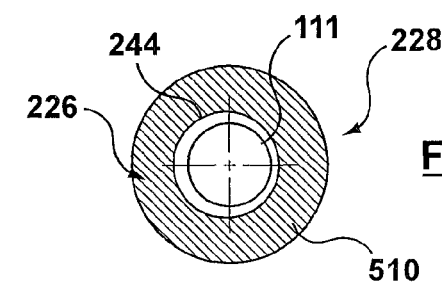
Figure 5E:
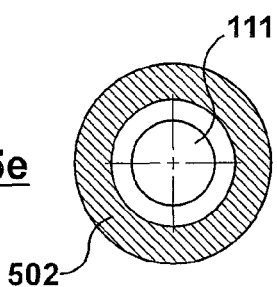

FIG. 5a shows as solid sections the body 204 of the valve pin bushing 114 and the valve pin 111 where no molding material flows. FIGS. 5b-5e show the transition of the flow channel 202 to annular as defined by the flow guiding surface 216. In FIG. 5e, the radially symmetric annular section 502 of the flow channel 202 defined by the neck 232 is shown. FIGS. 5f-5i show the shape of flow restrictor 224 and the shapes of the restricted region 226 and unrestricted region 228 that the flow restrictor 224 defines in the annular sections 504-510 of the flow channel 202. As can be seen, the flow restrictor 224 partially defines an inside boundary of each annular section 504-510. Furthermore, in this embodiment, the flow restrictor 224 is substantially entirely disposed on the upstream side of the projecting portion 206.

Figure 5J:
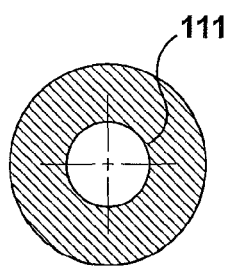

Progressing from FIG. 5f to FIG. 5i, the unrestricted region 228 remains the same width, as measured from the centerline 200 to the wall 230 of the flow channel 202, while the restricted region 226 becomes narrower and then widens. In this embodiment, this is true along the entire length of the flow restrictor 224. Specifically, along the entire length of the flow restrictor 224, from upstream to downstream, the annular section of the flow channel 202 is narrower adjacent the flow restrictor 224 and wider opposite the flow restrictor 224. FIG. 5j shows valve pin 111 and flow channel 202 downstream of valve pin bushing 114.

The valve pin bushing 114 can be made of any suitable material used in injection molding apparatuses, such as tool steel, and can be made using typical manufacturing processes.

Figure 6:
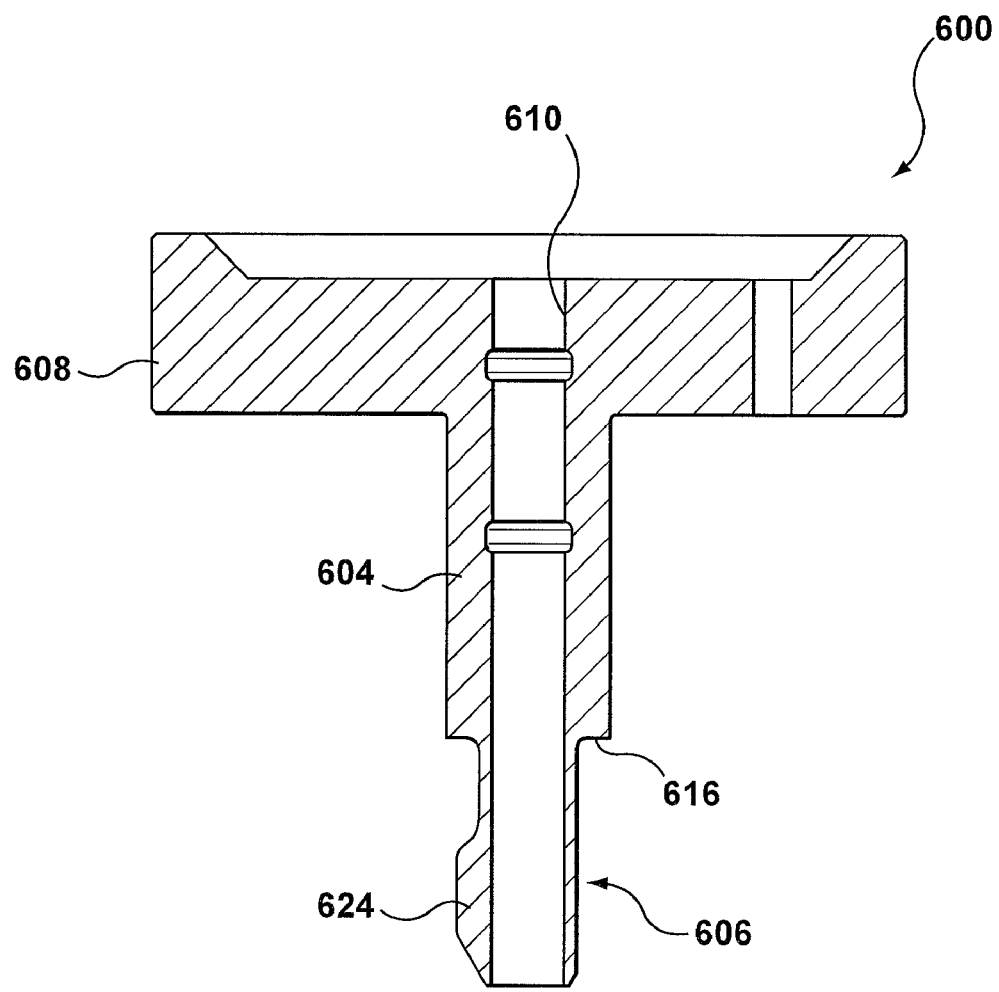
FIG. 6 is a section view of a valve pin bushing according to another embodiment of the present invention.

FIG. 6 shows a cross-sectional view of a valve pin bushing 600 according to another embodiment of the present invention. In the description of this embodiment, like reference numerals in the 600 series are used to describe like parts for ease of understanding, and some numerals are omitted for clarity. Only differing features and aspects of the present embodiment are described in detail. For description of the like parts, the other embodiments can be referenced. The features and aspects described for the other embodiments can be used accordingly with the present embodiment.

The valve pin bushing 600 includes a body 604, a projecting portion 606 having a flow restrictor 624, and an enlarged disc portion 608 extending from the body 604 at an end opposite the projecting portion 606. A bore 610 extends through the disc portion 608, the body 604, and the projecting portion 606 to accommodate a valve pin (e.g., valve pin 111). The body 604 includes a flat, annular surface 616 rather than a flow-guiding surface (such as in the valve pin bushing 114). The valve pin bushing 600 can be used in an injection molding apparatus, such as the hot half 100 described above or a hot runner thereof.

Figure 7:
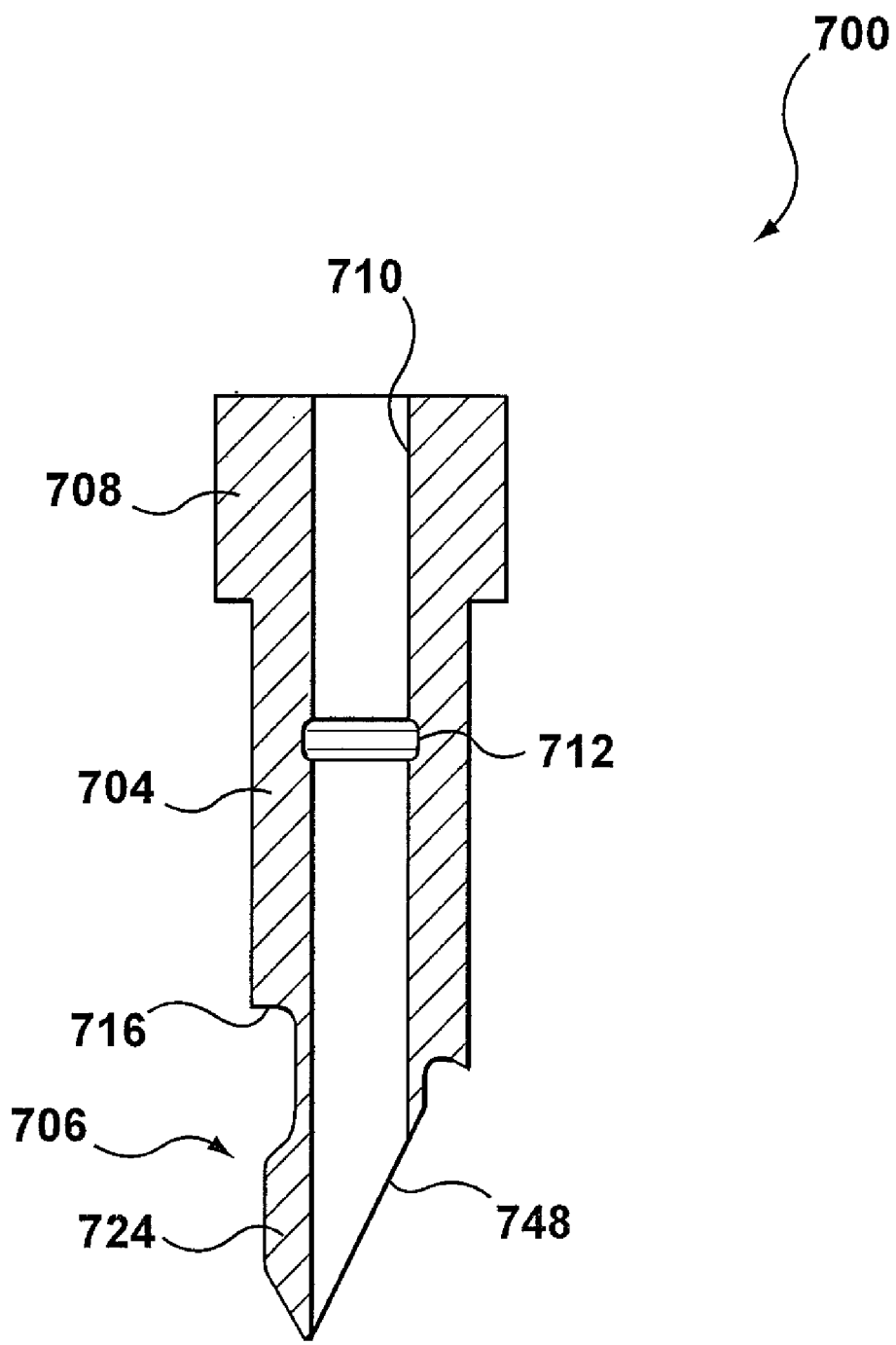
FIG. 7 is a section view of a valve pin bushing according to another embodiment of the present invention.

FIG. 7 shows a cross-sectional view of a valve pin bushing 700 according to another embodiment of the present invention. In the description of this embodiment, like reference numerals in the 700 series are used to describe like parts for ease of understanding, and some numerals are omitted for clarity. Only differing features and aspects of the present embodiment are described in detail. For description of the like parts, the other embodiments can be referenced. The features and aspects described for the other embodiments can be used accordingly with the present embodiment.

The valve pin bushing 700 includes a body 704, a projecting portion 706 having a flow restrictor 724, and a head portion 708 extending from the body 704 at an end opposite the projecting portion 706. A bore 710 extends through the head portion 708, the body 704, and the projecting portion 706 to accommodate a valve pin (e.g., valve pin 111). The valve pin bushing 700 can include a sealing groove 712 in an inside surface of the bore 710. At an end nearest the projecting portion 706, the body 704 has a flow-guiding surface 716. The head portion 708 can be disposed inside a counter-bore of a manifold (e.g., manifold 108) and serves to hold the valve pin bushing 700 in place. Alignment of the valve pin bushing 700 can be achieved, for example, by a key/slot combination on the head portion 708 and the manifold. In this embodiment, the projecting portion 706 of the valve pin bushing 700 has a beveled end 748, which allows for a larger unrestricted portion of the annular section of the flow channel that the projecting portion 706 and valve pin define. The valve pin bushing 700 can be used in an injection molding apparatus, such as the hot half 100 described above or a hot runner thereof.

Figure 8:
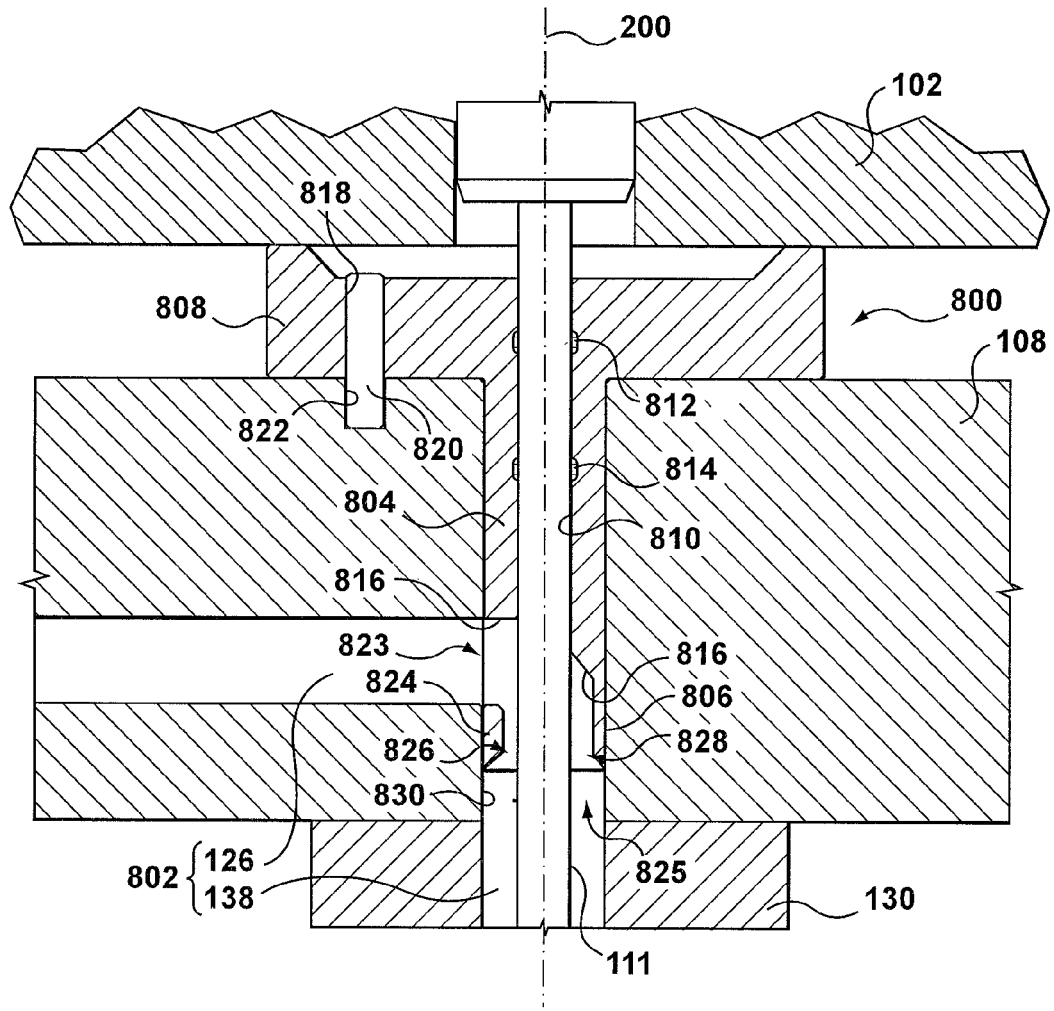
FIG. 8 is a section view of a valve pin bushing according to another embodiment of the present invention.

FIG. 8 shows a cross-sectional view of a valve pin bushing 800 according to another embodiment of the present invention. In the description of this embodiment, like reference numerals in the 800 series are used to describe like parts for ease of understanding. Only differing features and aspects of the present embodiment are described in detail. For description of the like parts, the other embodiments can be referenced. The features and aspects described for the other embodiments can be used accordingly with the present embodiment.

The valve pin bushing 800 is installed in an injection molding apparatus, such as the previously described hot half 100 or a hot runner thereof. The valve pin bushing 800 includes a body 804, a projecting portion 806 extending from the body 804 into a flow channel 802, and an enlarged disc portion 808 extending from the body 804 at an end opposite the projecting portion 806. A bore 810 extends through the disc portion 808, the body 804, and the projecting portion 806 to accommodate the valve pin 111 and can include one or more grooves 812, 814 to assist in sealing.

The body 804 is generally cylindrical, though other cross-sectional shapes are also suitable. The body 804 is disposed in a bore of the manifold 108. In other manifold-nozzle configurations, the body 804 can be disposed in a bore of the nozzle 110. At an end nearest the projecting portion 806, the body 804 has a flow-guiding surface 816. The flow-guiding surface 816 can be a flat, beveled surface (as shown) or a curved surface. One purpose of the flow-guiding surface 816 is to gradually guide the flow of molding material around the corner formed in the manifold melt channel 126.

The disc portion 808 is disposed between the back plate 102 and the manifold 108 and serves to hold the valve pin bushing 800 in place. The disc portion 808 includes a bore 818 for receiving an alignment pin 820, which is also inserted into a bore 822 of the manifold 108. The alignment pin 820 serves to properly orientate the valve pin bushing 800 with respect to the flow channel 802.

In this embodiment, the projecting portion 806 of the valve pin bushing 800 is tubular in shape. The upstream side of the projecting portion 806 has an inlet opening 823, and the downstream end of the projecting portion 806 has an outlet opening 825. The projecting portion 806 extends into the flow channel 802 and, in combination with the valve pin 111, provides the flow channel 802 with an annular section.

An upstream side of the projecting portion 806 includes a flow restrictor 824 disposed in the annular section of the flow channel 802. In this embodiment, the flow restrictor 824 is a thickened wall portion of the projecting portion 806 and is in contact with a wall 830 of the flow channel. As can be seen, the flow restrictor 824 defines a restricted region 826 of the annular section and a wider unrestricted region 828 opposite the restricted region 826. The flow restrictor 824 partially defines an outside boundary of the annular section. The restricted region 826 is on the upstream side of the valve pin bushing 800, and the unrestricted region 828 is on the downstream side of the valve pin bushing 800. Molding material can flow in both the restricted and unrestricted regions 826, 828, but the restricted region 826 offers greater resistance to flow than does the unrestricted region 828. In this embodiment, the flow restrictor 824 is separated from the valve pin 111 by a gap that defines the restricted region 826.

The flow restrictor 824 establishes resistance to flow of molding material on the upstream side of the valve pin 111, thereby diverting molding material to the downstream side of the valve pin 111. The resulting increased mass and/or velocity of molding material in the downstream side of the projecting portion 806 (i.e., in the valve pin shadow region) reduces the chance that molding material will stagnate there.

In this embodiment, from the flow restrictor 824 to the downstream tip of the valve pin 111 (near mold gate 142), the flow channel 802 is a continuous annular channel. In other embodiments, other components, such as valve pin guiding fins, may exist in the flow channel 802.

In still other embodiments, the flow restrictor 824 need not be entirely on the upstream side of the projecting portion 806, but can intrude to some degree on the downstream side, as long as a substantially continuous unrestricted region exists on the downstream side of the projecting portion 806.

Figure 9:
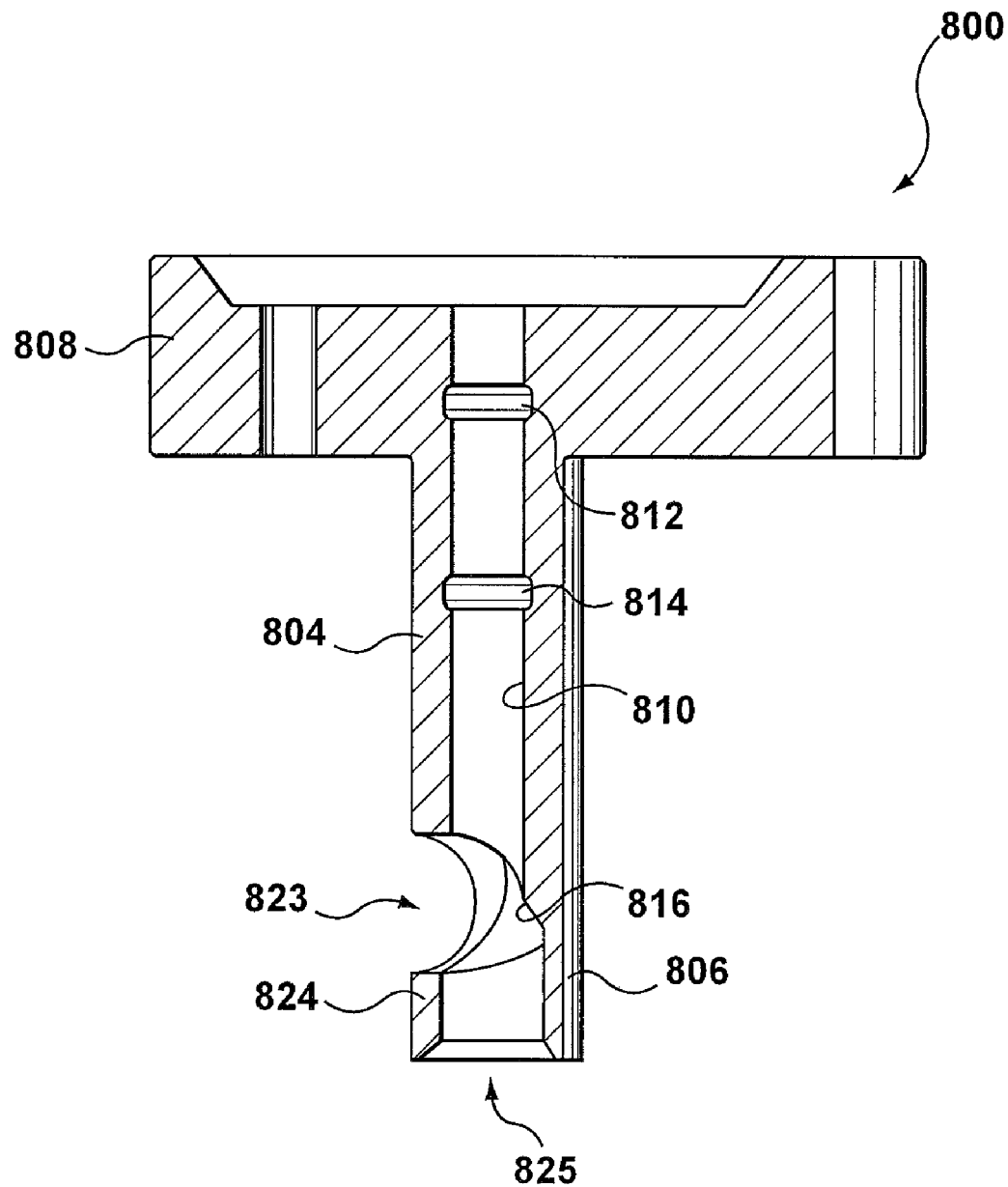
FIG. 9 is a sectioned perspective view of the valve pin bushing of FIG. 8.

FIG. 9 shows a sectioned perspective view of the valve pin bushing 800 when removed from the hot half 100.

Figure 10:
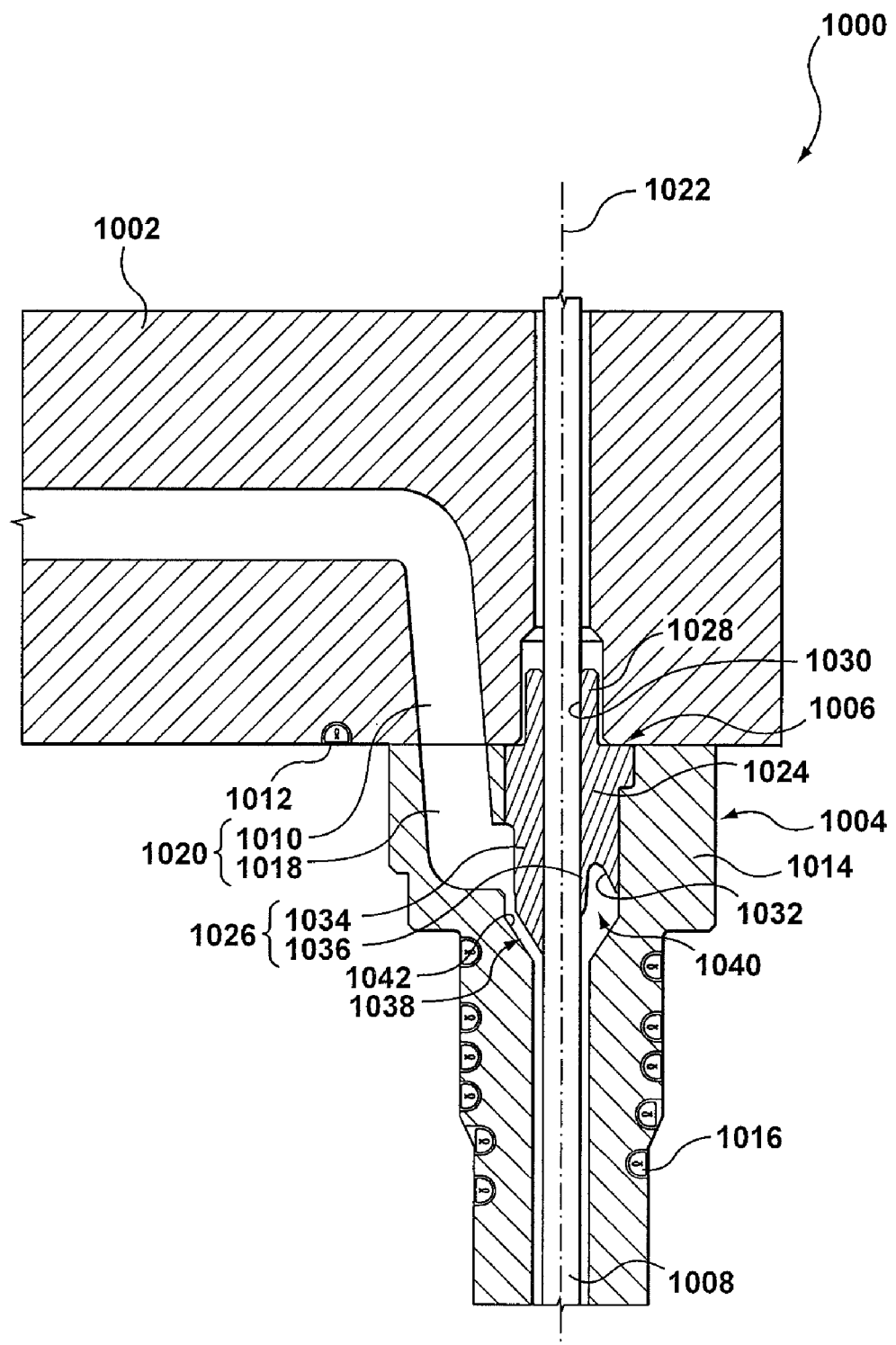
FIG. 10 is a section view of an injection molding apparatus according to another embodiment of the present invention.

FIG. 10 shows a partial cross-sectional view of an injection molding apparatus 1000, specifically, a hot runner, according to another embodiment of the present invention. The features and aspects described for the other embodiments can be used accordingly with the present embodiment.

The hot runner 1000 includes a manifold 1002, a nozzle 1004, a valve pin bushing 1006, and a valve pin 1008. The hot runner 1000 can be installed in a hot half, such as the hot half 100.

The manifold 1002 has a manifold channel 1010 for delivering molding material to the nozzle 1004. The manifold 1002 can also have a manifold heater 1012, which can be any type of heater, such as an electrical resistance heater wire.

The nozzle 1004 has a nozzle body 1014 and a nozzle tip (not shown). A nozzle heater 1016, such as an electrical resistance heater wire, and a thermocouple (not shown) can be installed on the nozzle body 1014. The nozzle 1004 has a nozzle channel 1018 running therethrough. The nozzle 1004 is coupled to the manifold 1002 such that the manifold channel 1010 is in communication with the nozzle channel 1018 to define a flow channel 1020 for molding material.

The valve pin 1008 extends from an actuator (not shown) through the manifold 1002, the valve pin bushing 1006, and the nozzle 1004. The valve pin 1008 controls flow of molding material through a mold gate (not shown). A centerline 1022 is shown aligned with the center of the valve pin 1008. As in the other embodiments, left of the centerline 1022 is referred to as the upstream side, and right of the centerline 1022 is referred to as the downstream side.

The valve pin bushing 1006 is disposed in a bore of the nozzle body 1014 and is held in place by the manifold 1002. The outside of the valve pin bushing 1006 may have a region of non-circular cross-section (e.g., a flat or key/slot combination) to properly orientate the valve pin bushing 1006 with respect to the flow channel 1020. The valve pin bushing 1006 serves to seal against leakage of molding material from the flow channel 1020 to outside the nozzle 1004 and manifold 1002. The valve pin bushing 1006 may also be designed to guide the valve pin 1008 to align with the mold gate.

The valve pin bushing 1006 includes a body 1024, a projecting portion 1026 extending from the body 1024 into the flow channel 1020, and a upper portion 1028 extending from the body 1024 into the manifold 1002 at an end opposite the projecting portion 1026. A bore 1030 extends through the upper portion 1028, the body 1024, and the projecting portion 1026 to accommodate the valve pin 1008. The valve pin 1008 is moveable in the bore 1030 and is in continual contact with the valve pin bushing 1006 over its full range of movement.

The body 1024 has a flow-guiding surface 1032 at an end nearest the projecting portion 1026. The flow-guiding surface 1032 can be a flat, beveled surface or a curved surface (as shown). One purpose of the flow-guiding surface 1032 is to gradually guide the flow of molding material around the corner formed in the nozzle melt channel 1018.

The projecting portion 1026 extends into the flow channel 1020 to, in conjunction with the valve pin 1008, define an annular section in the flow channel 1020. In this embodiment, the part of the flow channel 1020 in which the projecting portion 1026 extends is entirely defined by the nozzle channel 1018. In other channel configurations, this may differ.

The projecting portion 1026 can support or shield to the valve pin 1008 against forces exerted by the molding material as the molding material flows in the flow channel 1020.

An upstream side of the projecting portion 1026 includes a flow restrictor 1034 disposed in the annular section of the flow channel 1020. In this embodiment, the flow restrictor 1034 is an enlarged part of the projecting portion 1026. A downstream side of the projecting portion 1026 includes a narrow portion 1036. As can be seen, the flow restrictor 1034 defines a restricted region 1038 of the annular section and the narrow portion 1036 defines an unrestricted region 1040 of the annular section opposite the restricted region 1038. The restricted region 1038 is on the upstream side of the valve pin bushing 1006, and the unrestricted region 1040 is on the downstream side of the valve pin bushing 1006. Molding material can flow in both the restricted and unrestricted regions 1038, 1040, but the restricted region 1038 offers greater resistance to flow than does the unrestricted region 1040. In this embodiment, the flow restrictor 1034 is separated from a wall 1042 of the flow channel 1020 by a gap that defines the restricted region 1038.

The flow restrictor 1034 establishes resistance to flow of molding material on the upstream side of the projecting portion 1026, thereby diverting molding material to the downstream side of the projecting portion 1026 behind the narrow portion 1036. The resulting increased mass and/or velocity of molding material on the downstream side of the projecting portion 1026 (i.e., in the valve pin shadow region) reduces the chance that molding material will stagnate there.

In this embodiment, from the flow restrictor 1034 to the downstream tip of the valve pin 1008, the flow channel 1020 is a continuous annular channel. In other embodiments, other components, such as valve pin guiding fins, may exist in the flow channel 1020.

In still other embodiments, the flow restrictor 1034 need not be entirely on the upstream side of the projecting portion 1026, but can intrude to some degree on the downstream side, as long as a substantially continuous unrestricted region exists on the downstream side of the projecting portion 1026.

Figure 11:
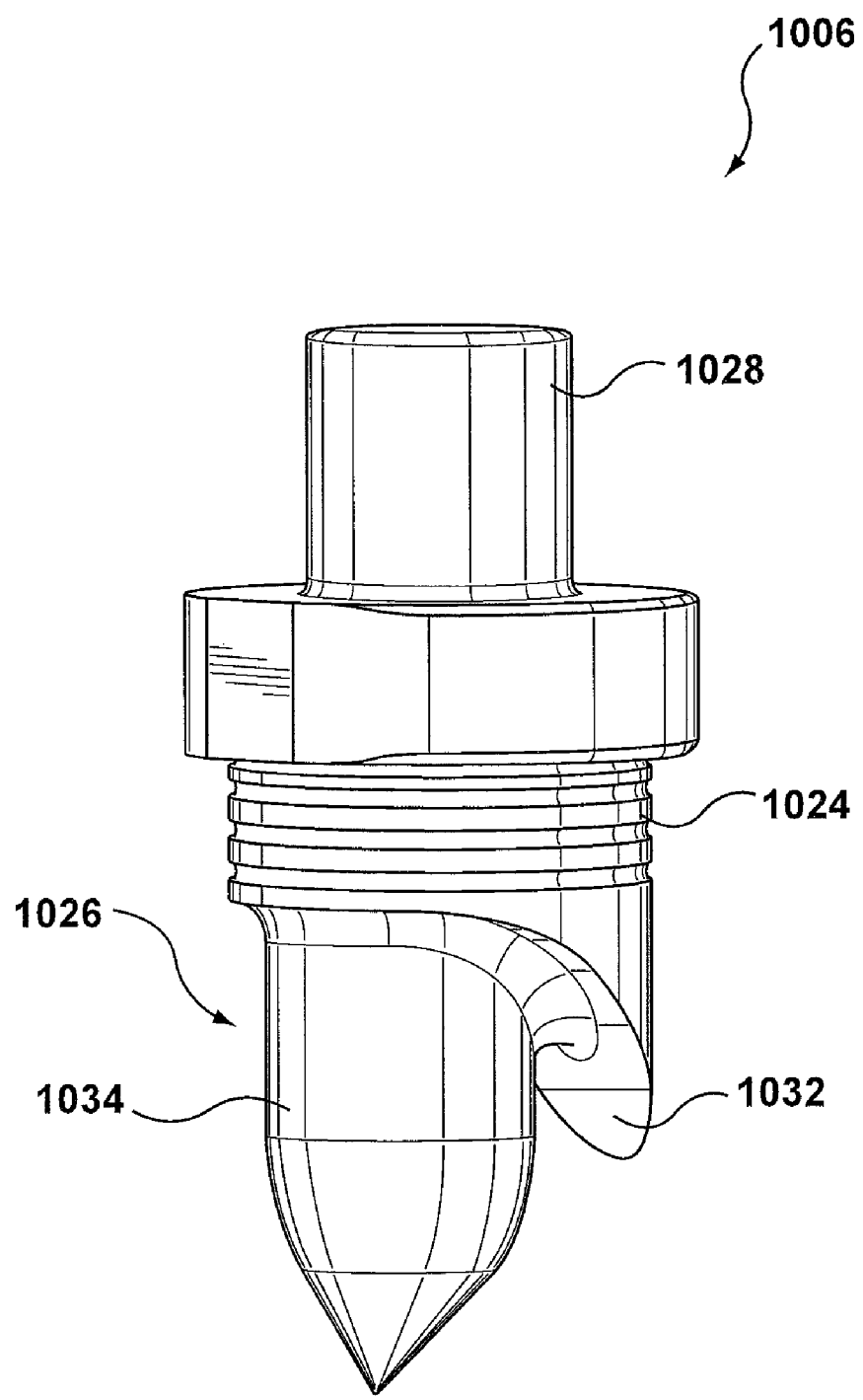
FIG. 11 is a perspective view of the valve pin bushing of FIG. 10.

FIG. 11 shows the valve pin bushing 1006 in perspective. The curved shape of the flow-guiding surface 1032, which guides molding material from the upstream side to the downstream side of the valve pin bushing 1006, can be seen. The shape of the flow restrictor 1034 can also be seen. In this embodiment, the flow restrictor 1034 is generally convex, which helps in diverting flow of molding material to the downstream side of the valve pin 1008. Towards the downstream side, the flow restrictor 1034 gradually shrinks and makes a transition to the narrow portion 1036 (obstructed from view in this figure). In other embodiments, other shapes for the flow restrictor 1034 can be used, resulting in other shapes for the restricted and unrestricted regions that the flow restrictor 1034 defines.

In other embodiments, a flow restrictor can be a portion of a flow channel wall that defines a restricted region and consequently an unrestricted region.

Although many embodiments of the present invention have been described, those of skill in the art will appreciate that other variations and modifications may be made without departing from the spirit and scope thereof as defined by the appended claims. All patents and publications discussed herein are incorporated in their entirety by reference thereto.

What is claimed is:

1. A valve pin bushing for use in an injection molding apparatus, the valve pin bushing comprising:
   a head portion;
   a body extending from the head portion;
   a projecting portion extending from the body opposite the head portion;
   a flow guiding surface disposed at an intersection of the body and the projecting portion;
   a bore disposed through the head portion, the body and the projecting portion, the bore including a bore central axis; and
   a flow restrictor formed on the projecting portion, wherein a central axis of the projecting portion at the flow restrictor is offset from the bore central axis.

2. The valve pin bushing of claim 1, wherein the flow restrictor comprises a lateral protrusion.

3. The valve pin bushing of claim 1, wherein the flow restrictor comprises a thickened wall portion of the projecting portion.

4. The valve pin bushing of claim 1, wherein the projecting portion of the valve pin bushing is generally tubular.

5. The valve pin bushing of claim 1, wherein an end of the projecting portion opposite the body is beveled.

6. The valve pin bushing of claim 1, further comprising a sealing groove disposed in the bore.

7. A valve pin bushing for use in an injection molding apparatus, the valve pin bushing comprising:
   a head portion;
   a body extending from the head portion;
   a projecting portion extending from the body opposite the head portion;
   a flow guiding surface disposed at an intersection of the body and the projecting portion;
   a bore disposed through the head portion, the body and the projecting portion; and
   a flow restrictor formed on the projecting portion, wherein the projecting portion is generally tubular and includes an outer surface, an inner surface defining the bore, and a wall between the outer surface and the inner surface, wherein the outer surface at the flow restrictor is generally circular in cross-section, and wherein the flow restrictor comprises thickened portion of the wall projecting inwardly from the outer surface.

8. The injection molding apparatus of claim 7, further comprising an inlet opening disposed between the flow restrictor and the flow guiding surface.

9. The injection molding apparatus of claim 8, further comprising an outlet opening at an end of the projecting portion opposite the flow guiding surface.

10. An injection molding apparatus, comprising:
    a back plate;
    an actuator coupled to the back plate;
    a mold plate coupled to the back plate;
    a manifold disposed between the back plate and the mold plate, the manifold comprising a manifold channel;
    a valve pin bushing coupled to the manifold and comprising a flow restrictor disposed in an annular section of the manifold channel, wherein the flow restrictor defines a restricted region of the annular section on an upstream side of the valve pin bushing with respect to an unrestricted region of the annular section on a downstream side of the valve pin bushing; and
    a valve pin connected to the actuator and extending through a bore of the valve pin bushing and through the manifold channel, the valve pin moveable in the bore of the valve pin bushing.

11. The injection molding apparatus of claim 10, wherein the valve pin bushing further comprises a head portion disposed between the manifold and the back plate.

12. The injection molding apparatus of claim 10, wherein the valve pin bushing comprises a body and a projecting portion extending from the body, wherein the flow restrictor is disposed on the projecting portion.

13. The injection molding apparatus of claim 10, wherein the flow restrictor comprises a lateral protrusion.

14. The injection molding apparatus of claim 10, wherein the flow restrictor is separated from a wall of the manifold channel by a gap.

15. The injection molding apparatus of claim 12, wherein the flow restrictor comprises a thickened wall portion of the projecting portion.

16. The injection molding apparatus of claim 15, wherein the upstream side of the projecting portion has an inlet opening upstream of the thickened wall portion, and a downstream end of the projecting portion has an outlet opening.

17. The injection molding apparatus of claim 15, wherein the thickened wall portion is in contact with a wall of the manifold channel.

18. The injection molding apparatus of claim 12, wherein the body further comprises a flow-guiding surface at an end nearest the projecting portion.

* * * * *